US009990256B1

(12) United States Patent
Natanzon

(10) Patent No.: US 9,990,256 B1
(45) Date of Patent: Jun. 5, 2018

(54) STORAGE MANAGEMENT SYSTEM AND METHOD

(71) Applicant: EMC IP Holding Company LLC, Hopkinton, MA (US)

(72) Inventor: Assaf Natanzon, Tel Aviv (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 90 days.

(21) Appl. No.: 15/084,790

(22) Filed: Mar. 30, 2016

(51) Int. Cl.
*G06F 11/00* (2006.01)
*G06F 11/14* (2006.01)
*G06F 3/06* (2006.01)

(52) U.S. Cl.
CPC .......... *G06F 11/1469* (2013.01); *G06F 3/065* (2013.01); *G06F 3/067* (2013.01); *G06F 3/0619* (2013.01); *G06F 11/1451* (2013.01); *G06F 2201/805* (2013.01); *G06F 2201/84* (2013.01)

(58) Field of Classification Search
CPC .................... G06F 11/1451; G06F 11/1469
See application file for complete search history.

(56) References Cited

U.S. PATENT DOCUMENTS

| | | | | |
|---|---|---|---|---|
| 6,721,902 B1* | 4/2004 | Cochran | ............ | G06F 11/1456 714/13 |
| 6,910,178 B1* | 6/2005 | Kiselev | ................ | G06F 11/183 714/797 |
| 2004/0078641 A1* | 4/2004 | Fleischmann | ....... | G06F 11/1469 714/6.12 |
| 2007/0283079 A1* | 12/2007 | Iwamura | .............. | G11C 16/349 711/103 |
| 2008/0168108 A1* | 7/2008 | Molaro | ............... | G06F 11/1435 |
| 2010/0115215 A1* | 5/2010 | Rosychuk | .......... | G06F 11/1456 711/162 |
| 2010/0325345 A1* | 12/2010 | Ohno | .................... | G06F 3/0652 711/103 |
| 2015/0178171 A1* | 6/2015 | Bish | .................... | G06F 11/1451 714/20 |

* cited by examiner

*Primary Examiner* — Charles Ehne
(74) *Attorney, Agent, or Firm* — Brian J. Colandreo; Mark H. Whittenberger; Holland & Knight LLP

(57) ABSTRACT

A method, computer program product, and computing system for identifying a storage target that has become corrupt within a data array. The storage target includes one or more corrupt data portions. A relevant backup copy of the storage target is identified. A "broken" mirror is established between the storage target and the relevant backup copy that identifies one or more differences between the storage target and the relevant backup copy. The storage target is rebuilt by overwriting the corrupt data portions within the storage target with corresponding non-corrupt data obtained from the relevant backup copy.

18 Claims, 4 Drawing Sheets

STORAGE MANAGEMENT SYSTEM AND METHOD

TECHNICAL FIELD

This disclosure relates to storage systems and, more particularly, to RAID-based storage systems.

BACKGROUND

Storing and safeguarding electronic content is of paramount importance in modern business. Accordingly, various methodologies may be employed to protect such electronic content. Examples of such methodologies may include the repeated generation of backup copies of the data (in the form of snapshots) that may be stored remotely, wherein these backup copies may be utilized to rebuild any data that is lost/corrupted. Unfortunately, during such rebuild procedures, access to the data may be restricted or compromised.

SUMMARY OF DISCLOSURE

In one implementation, a computer-implemented method is executed on a computing device and includes identifying a storage target that has become corrupt within a data array. The storage target includes one or more corrupt data portions. A relevant backup copy of the storage target is identified. A "broken" mirror is established between the storage target and the relevant backup copy that identifies one or more differences between the storage target and the relevant backup copy. The storage target is rebuilt by overwriting the corrupt data portions within the storage target with corresponding non-corrupt data obtained from the relevant backup copy.

One or more of the following features may be included. A read request may be received for the storage target. A determination may be made concerning whether the read request concerns the one or more corrupt data portions included within the storage target that have not yet been recovered from the relevant backup copy. If the read request concerns the one or more data portions included within the storage target that have not yet been recovered from the relevant backup copy, the data requested in the read request may be obtained from the relevant backup copy. If the read request does not concern the one or more data portions included within the storage target that have not yet been recovered from the relevant backup copy, the data requested in the read request may be obtained from the storage target. Identifying a relevant backup copy of the storage target may include identifying a backup copy of the storage target, chosen from a plurality of backup copies of the storage target, which predates a corruption date/time of the storage target. The relevant backup copy may be a snapshot of the storage target. A write request may be received for the storage target and the data may be written to the storage target and the relevant backup copy.

In another implementation, a computer program product resides on a computer readable medium and has a plurality of instructions stored on it. When executed by a processor, the instructions cause the processor to perform operations including identifying a storage target that has become corrupt within a data array. The storage target includes one or more corrupt data portions. A relevant backup copy of the storage target is identified. A "broken" mirror is established between the storage target and the relevant backup copy that identifies one or more differences between the storage target and the relevant backup copy. The storage target is rebuilt by overwriting the corrupt data portions within the storage target with corresponding non-corrupt data obtained from the relevant backup copy.

One or more of the following features may be included. A read request may be received for the storage target. A determination may be made concerning whether the read request concerns the one or more corrupt data portions included within the storage target that have not yet been recovered from the relevant backup copy. If the read request concerns the one or more data portions included within the storage target that have not yet been recovered from the relevant backup copy, the data requested in the read request may be obtained from the relevant backup copy. If the read request does not concern the one or more data portions included within the storage target that have not yet been recovered from the relevant backup copy, the data requested in the read request may be obtained from the storage target. Identifying a relevant backup copy of the storage target may include identifying a backup copy of the storage target, chosen from a plurality of backup copies of the storage target, which predates a corruption date/time of the storage target. The relevant backup copy may be a snapshot of the storage target. A write request may be received for the storage target and the data may be written to the storage target and the relevant backup copy.

In another implementation, a computing system including a processor and memory is configured to perform operations including identifying a storage target that has become corrupt within a data array. The storage target includes one or more corrupt data portions. A relevant backup copy of the storage target is identified. A "broken" mirror is established between the storage target and the relevant backup copy that identifies one or more differences between the storage target and the relevant backup copy. The storage target is rebuilt by overwriting the corrupt data portions within the storage target with corresponding non-corrupt data obtained from the relevant backup copy.

One or more of the following features may be included. A read request may be received for the storage target. A determination may be made concerning whether the read request concerns the one or more corrupt data portions included within the storage target that have not yet been recovered from the relevant backup copy. If the read request concerns the one or more data portions included within the storage target that have not yet been recovered from the relevant backup copy, the data requested in the read request may be obtained from the relevant backup copy. If the read request does not concern the one or more data portions included within the storage target that have not yet been recovered from the relevant backup copy, the data requested in the read request may be obtained from the storage target. Identifying a relevant backup copy of the storage target may include identifying a backup copy of the storage target, chosen from a plurality of backup copies of the storage target, which predates a corruption date/time of the storage target. The relevant backup copy may be a snapshot of the storage target. A write request may be received for the storage target and the data may be written to the storage target and the relevant backup copy.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
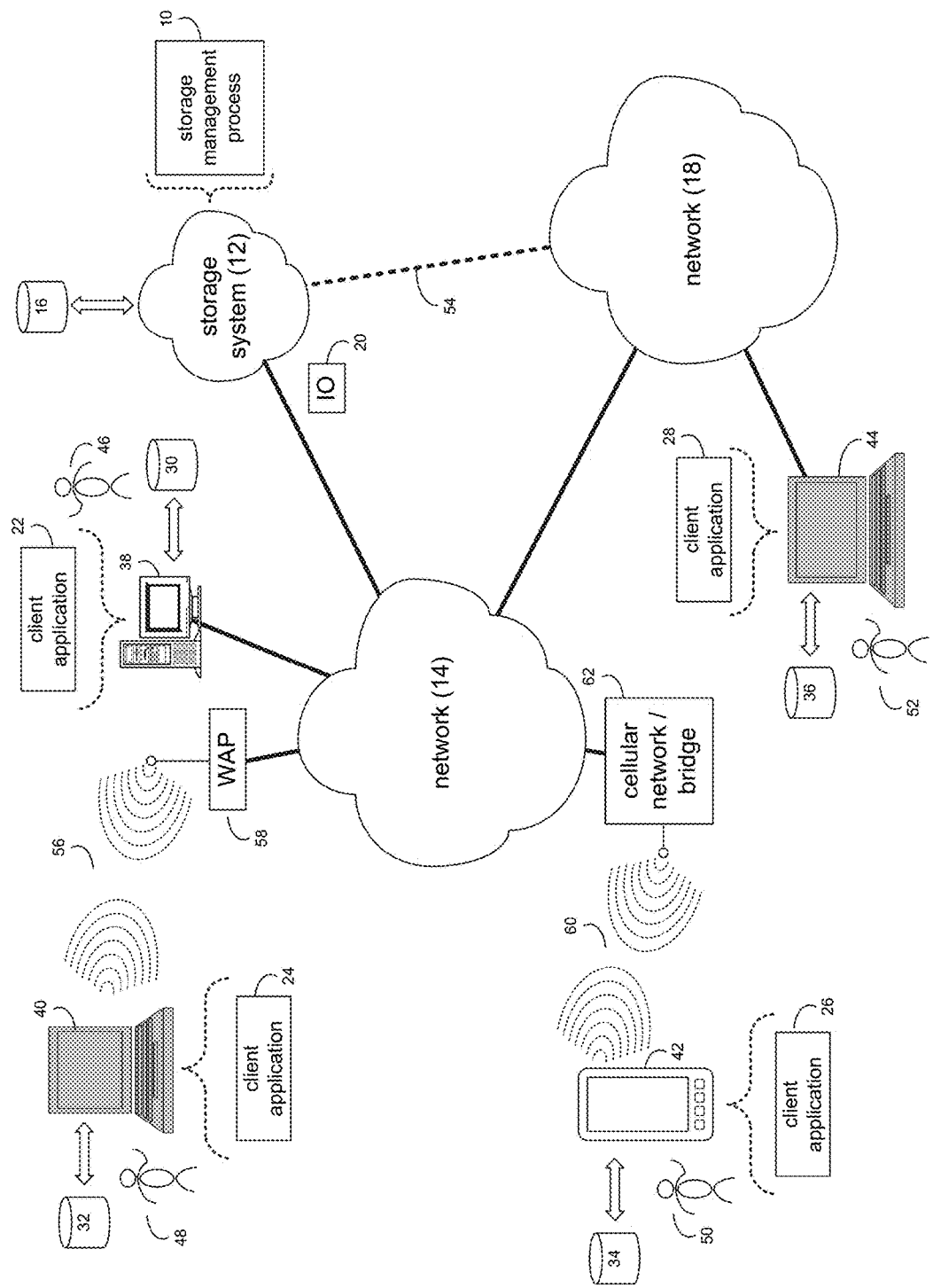
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
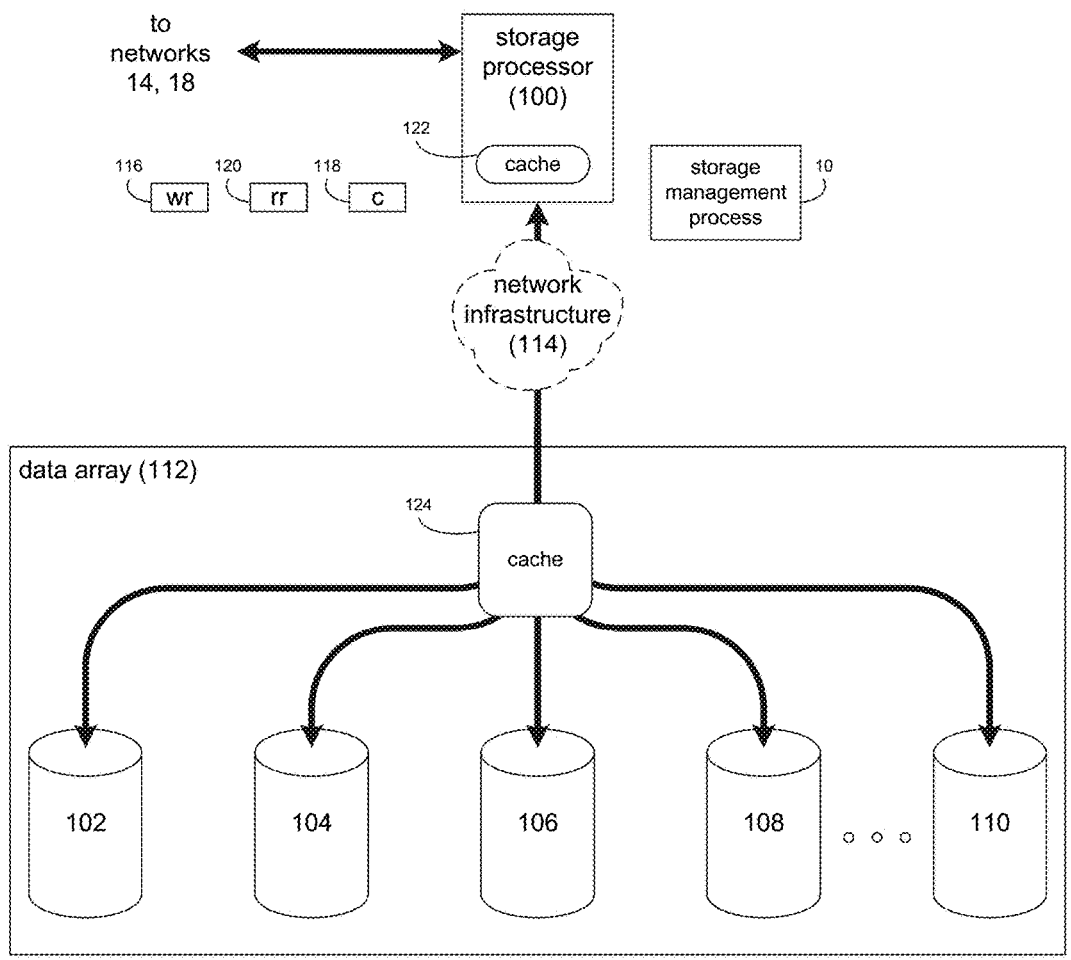
FIG. 2 is a diagrammatic view of the storage system of FIG. 1.

Data Storage System:

Referring also to FIG. 2, there is shown a general implementation of storage system 12. In this general implementation, data storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Figure 3:
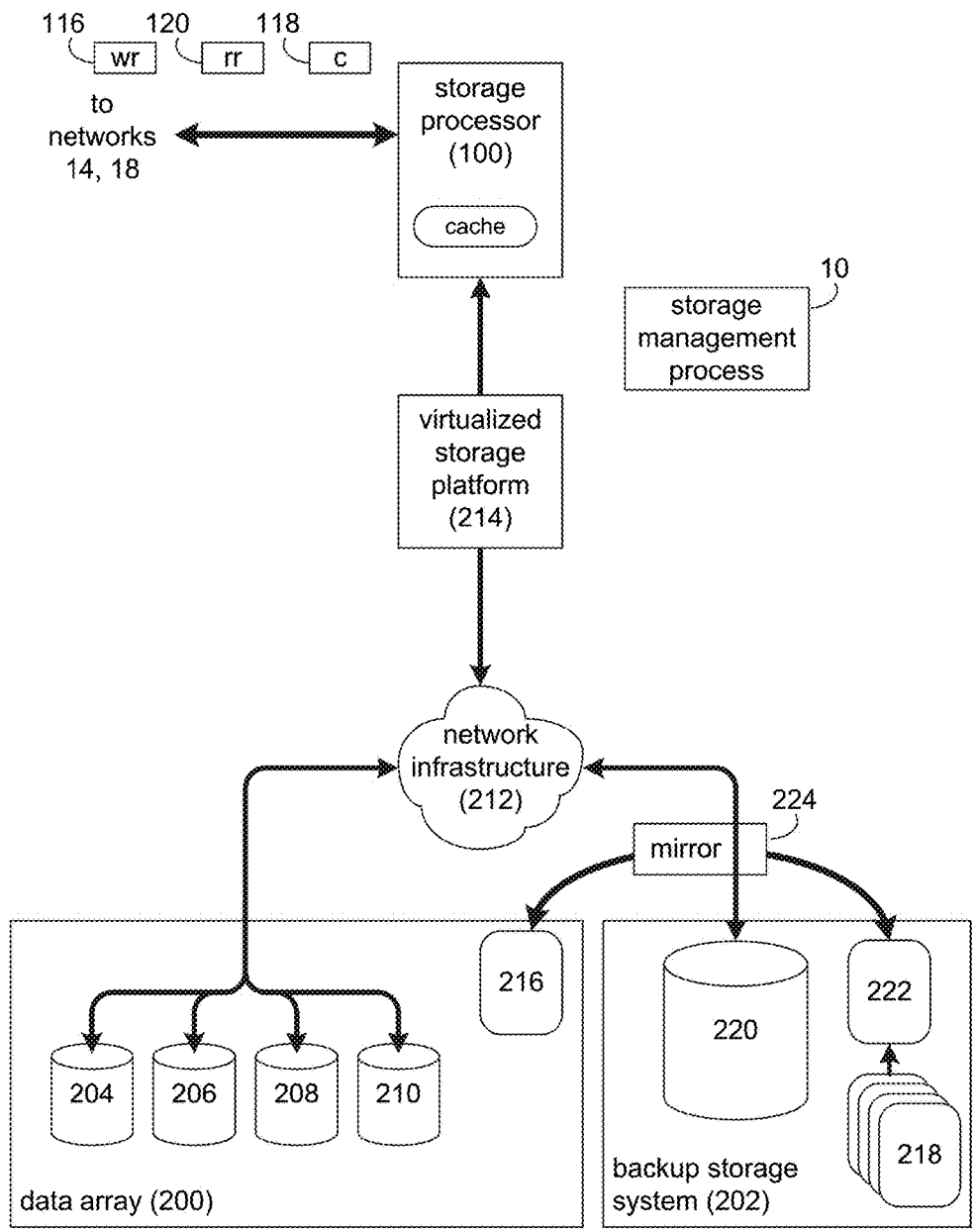
FIG. 3 is a diagrammatic view of another embodiment of the storage system of FIG. 1.

The Storage Management Process:

Referring also to FIG. 3, there is shown another implementation of storage system 12 that includes data array 200 and backup storage system 202. For illustrative purposes only, data array 200 is shown to include four storage targets (e.g., storage targets 204, 206, 208, 210).

In this implementation, storage system 12 is shown to include storage processor 100. Data array 200 and storage processor 100 may be coupled using network infrastructure 212, examples of which may include but are not limited to an Ethernet (e.g., Layer 2 or Layer 3) network, a fiber channel network, an InfiniBand network, or any other circuit switched/packet switched network.

Storage system 12 may also include a virtualized storage platform appliance (e.g., virtualized storage platform 214) that may allow for seamless access to the resources of data array 200 and the various data portions contained/defined therein. An example of virtualized storage platform 214 may include but is not limited to a VPLEX system produced by the EMC Corporation of Hopkinton, Mass. As is known in the art, virtualized storage platform 214 may implement a distributed "virtualization" layer within and across geographically disparate data arrays (e.g., data array 200 and other data arrays (not shown)), storage area networks and/or data centers, thus allowing multiple, discrete storage entities to appear as one common entity.

As discussed above, the instruction sets and subroutines of storage management process 10 may be executed by one or more processors (not shown) and one or more memory architectures (not shown) included within storage system 12 and/or included within data array 112. Further and for the following example, the instruction sets and subroutines of storage management process 10 may be executed (in whole or in part) by one or more processors (not shown) and one or more memory architectures (not shown) included within virtualized storage platform 214.

For the following example, assume that virtualized storage platform 214 includes functionality that may be configured to define and expose one or more logical units that users of virtualized storage platform 214 may use and access to store data. Specifically, assume that virtualized storage platform 214 defines and exposes LUN 216 that may allow for the storage of data within data array 200.

As discussed above, storage system 12 may include backup storage system 202 that may be coupled to storage processor 100 and/or virtualized storage platform 214 via network infrastructure 214. Storage management process 10 may be configured to generate one or more historical records (e.g., historical records 218) of the content of LUN 216 at various points in time. An example of backup storage system 202 may include, but is not limited to, a Data Domain™ system offered by EMC™ Corporation of Hopkinton, Mass., USA. An example of such a historical record is a snapshot that is indicative of the content of LUN 216.

Typically, these historical records (e.g., historical records 218) are differential in nature, in that they show the difference between the data state that the historical record is identifying and the last known data state. For example, if a first historical record indicated that five data blocks were stored within LUN 216 and, prior to the generation of the next historical record, three more data blocks were added to LUN 216, the next historical record generated for data array 130 would indicate the addition of the three added data blocks (i.e., the difference), as opposed to the presence of eight data blocks.

Backup storage system 202 may include storage device 220 that is configured to store historical records 218. Examples of storage device 220 may include: a hard disk drive; a RAID system; and all forms of flash memory storage devices.

Assume for the following example that storage management system 10 generates a snapshot of LUN 216 every six hours, wherein these snapshots are stored on storage device 220 as historical records 218. Accordingly, in the event that the data stored within LUN 216 becomes corrupt, the historical record that predates the data corruption event may be selected by storage management process 10 and used to restore LUN 216 to an uncorrupt state.

Figure 4:
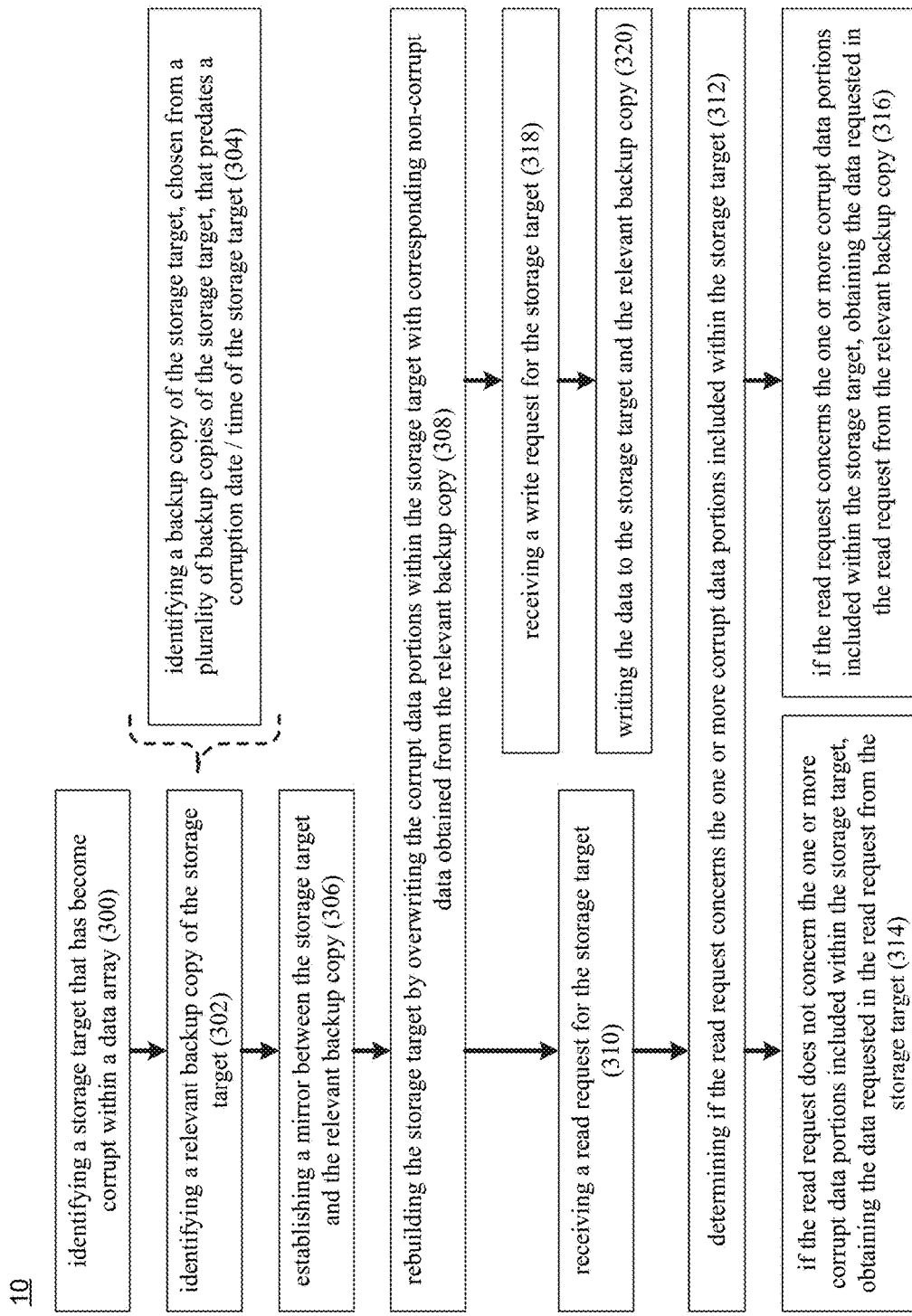
FIG. 4 is a flow chart of the storage management process of FIG. 1.

Referring also to FIG. 4 and continuing with the above-stated example, assume that storage management process 10 identifies 300 a storage target (e.g., LUN 216) that has become corrupt within a data array (e.g., data array 200), wherein the storage target (e.g., LUN 216) includes one or more corrupt data portions (e.g., one or more corrupt data blocks). For example, storage management process 10 may routinely examine the status of the data blocks within LUN 216 during normal operation to confirm their integrity (i.e., to confirm that they are not corrupted). Additionally/alternatively, a user or administrator of storage system 12 may discover that an application is not functioning properly. For this example, assume that it is determined that a plurality of data blocks (e.g., data blocks 1,217-1,248) within LUN 216 have become corrupt. Such corruption may occur for various reasons, such as a mechanical or electrical failure of a portion of a storage target (e.g., one or more of storage targets 204, 206, 208, 210) within data array 210 or a software issue that resulted in the writing of corrupt data to data blocks 1,217-1,248 (e.g., a bug in an application).

Once identified 300, storage management process 10 may identify 302 a relevant backup copy (e.g., chosen from historical records 218) of the storage target (e.g., LUN 216). When identifying 302 a relevant backup copy (e.g., chosen from historical records 218) of the storage target (e.g., LUN 216), storage management process 10 may identify 304 a backup copy of the storage target (e.g., LUN 216), chosen from a plurality of backup copies (e.g., historical records 218) of the storage target (e.g., LUN 216), that predates a corruption date/time of the storage target (e.g., LUN 216).

As discussed above, historical records 218 may be snapshots of the storage target (e.g., LUN 216) and, therefore, the relevant backup copy may be one of historical records 218. When identifying 302 the relevant backup copy, storage management process 10 may review the discrete historical records within historical records 218 to identify 304 the newest historical record that includes uncorrupted data within data blocks 1,217-1,248. Assuming (for this example) that the corruption occurred nine hours ago, the historical record (i.e., snapshot) that was generated six hours ago would have corrupted data within data blocks 1,217-1,248, while the historical record (i.e., snapshot) that was generated twelve hours ago would have uncorrupted data within data blocks 1,217-1,248. Accordingly, storage management process 10 may identify 302 the twelve hour old snapshot (e.g., historical record 222) as the relevant backup copy (as it predates the corruption date/time of the storage target).

Once identified 302, storage management process 10 may establish 306 mirror 224 between the storage target (e.g., LUN 216) and the relevant backup copy (e.g., historical record 222) and may rebuild 308 the storage target (e.g., LUN 216) by overwriting the corrupt data portions (e.g., data blocks 1,217-1,248) within the storage target (e.g., LUN 216) with corresponding non-corrupt data obtained from the relevant backup copy (e.g., historical record 222). Specifically and once mirror 224 is established 306, storage management process 10 may rebuild 308 LUN 216 by obtaining (via mirror 224) uncorrupt copies of data blocks 1,217-1,248 from historical record 222 and may use that uncorrupted data to overwrite corrupt data blocks 1,217-1,248 within LUN 216.

When mirror 224 is established 306, it may be configured as a "broken" mirror that is being repaired, namely a mirror in which one of the legs (e.g., one of the targets) of mirror 224 was inaccessible and received IO requests were written only to one of the two mirror legs. In such cases and when access to the inaccessible leg of mirror 224 is restored, mirror 224 may read the changes from the leg of mirror 224 that was working and may copy those changes to the leg that was broken (thus repairing mirror 224).

In the above-described situation in which mirror 224 is established 306 as a "broken" mirror that is being repaired, storage management process 10 may determine the location (s) (e.g., within LUN 216) that have changed between the time of the relevant backup copy (e.g., historical record 222) and the time of the current corrupted data state. Additionally, storage management process 10 may redefine the mirroring methodology from a "broken" mirror state to a functioning mirror state. So storage management process 10 may now automatically repair the corrupted areas (e.g., corrupt data blocks 1,217-1,248 within LUN 216) by e.g., determining a list of differences between the latest backup image (e.g., the snapshot that is 6 hours old) and the desired image (e.g., the snapshot that is 12 hours old) from backup storage system 202 and determining a list of differences between the latest backup image (e.g., the snapshot that is 6 hours old) and the current image (e.g., as currently stored within LUN 216), so that storage management process 10 may eliminate these differences by obtaining the appropriate uncorrupted data from (in this example) historical record 222.

During this rebuild 308 of LUN 216, storage management process 10 may continue to process write requests (e.g., write request 116) and may continue to process read requests (e.g., read request 120) that are received by storage management process 10 concerning LUN 216.

In the event that a write request (e.g., write request 116) is received 318 that concerns the writing of new data (e.g., content 118) to LUN 216, storage manage process 10 may execute this write request (e.g., write request 116) in a traditional mirrored fashion (e.g., wherein write request 116 is provided to both LUN 216 and historical record 222) and the new data (e.g., content 118) is written 320 to both LUN 216 and historical record 222).

However, read requests (e.g., read request 120) concerning LUN 216 may be executed by storage management process 10 in a manner different from a traditional mirrored arrangement.

Accordingly, if storage management process 10 receives 310 a read request (e.g., read request 120) for the storage target (e.g., LUN 216), storage management process 10 may determine 312 if the read request (e.g., read request 120) concerns the one or more corrupt data portions (e.g., corrupt data blocks 1,217-1,248) included within the storage target (e.g., LUN 216) that have not yet been recovered from the relevant backup copy.

If the read request (e.g., read request 120) does not concern the one or more corrupt data portions (e.g., corrupt data blocks 1,217-1,248) included within the storage target (e.g., LUN 216), storage management process 10 may obtain 314 the data requested in read request 120 from the storage target (e.g., LUN 216). Specifically, storage management process 10 may obtain 314 the data requested in read request 120 from LUN 216 because the data (in an uncorrupted form) is available from LUN 216 and LUN 216, which is part of data array 200, may provide a higher level of read performance (when compared to backup storage system 202), since backup storage system 202 may be tuned for performance of large sequential updates and may have very poor random read performance.

If the read request (e.g., read request 120) does concern the one or more corrupt data portions (e.g., corrupt data blocks 1,217-1,248) included within the storage target (e.g., LUN 216), storage management process 10 may obtain 316 the data requested in read request 120 from the relevant backup copy (e.g., historical record 222). Specifically, storage management process 10 may obtain 316 the data requested in read request 120 from historical record 222 because the data (in an uncorrupted form) is not available from LUN 216 and, therefore, the only place to obtain the data requested in read request 120 is from backup storage system 202 (even though backup storage system 202 may have a lower level of read performance when compared to LUN 216).

Once the rebuilding 308 of LUN 216 is complete, storage management process 10 may remove mirror 224 between the storage target (e.g., LUN 216) and the relevant backup copy (e.g., historical record 222) and all future read and write requests may be handled by LUN 216.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    identifying a storage target that has become corrupt within a data array, wherein the storage target includes one or more corrupt data portions;
    identifying a relevant backup copy of the storage target;
    establishing a broken mirror between the storage target and the relevant backup copy that identifies one or more differences between the storage target and the relevant backup copy;
    rebuilding the storage target by overwriting the corrupt data portions within the storage target with corresponding non-corrupt data obtained from the relevant backup copy;
    receiving a read request for the storage target during the rebuilding of the storage target; and
    determining if the read request concerns the one or more corrupt data portions included within the storage target that have not yet been recovered from the relevant backup copy.

2. The computer-implemented method of claim 1 further comprising:
    if the read request concerns the one or more corrupt data portions included within the storage target that have not yet been recovered from the relevant backup copy, obtaining the data requested in the read request from the relevant backup copy.

3. The computer-implemented method of claim 1 further comprising:
    if the read request does not concern the one or more corrupt data portions included within the storage target that have not yet been recovered from the relevant backup copy, obtaining the data requested in the read request from the storage target.

4. The computer-implemented method of claim 1 wherein identifying a relevant backup copy of the storage target includes:
    identifying a backup copy of the storage target, chosen from a plurality of backup copies of the storage target, that predates a corruption date/time of the storage target.

5. The computer-implemented method of claim 1 wherein the relevant backup copy is a snapshot of the storage target.

6. The computer-implemented method of claim 1 further comprising:
    receiving a write request for the storage target; and
    writing the data to the storage target and the relevant backup copy.

7. A computer program product residing on a non-transitory computer readable medium having a plurality of instructions stored thereon which, when executed by a processor, cause the processor to perform operations comprising:
    identifying a storage target that has become corrupt within a data array, wherein the storage target includes one or more corrupt data portions;
    identifying a relevant backup copy of the storage target;

establishing a broken mirror between the storage target and the relevant backup copy that identifies one or more differences between the storage target and the relevant backup copy;

rebuilding the storage target by overwriting the corrupt data portions within the storage target with corresponding non-corrupt data obtained from the relevant backup copy;

receiving a read request for the storage target during the rebuilding of the storage target; and determining if the read request concerns the one or more corrupt data portions included within the storage target that have not yet been recovered from the relevant backup copy.

8. The computer program product of claim 7 further comprising instructions for:

if the read request concerns the one or more corrupt data portions included within the storage target that have not yet been recovered from the relevant backup copy, obtaining the data requested in the read request from the relevant backup copy.

9. The computer program product of claim 7 further comprising instructions for:

if the read request does not concern the one or more corrupt data portions included within the storage target that have not yet been recovered from the relevant backup copy, obtaining the data requested in the read request from the storage target.

10. The computer program product of claim 7 wherein identifying a relevant backup copy of the storage target includes:

identifying a backup copy of the storage target, chosen from a plurality of backup copies of the storage target, that predates a corruption date/time of the storage target.

11. The computer program product of claim 7 wherein the relevant backup copy is a snapshot of the storage target.

12. The computer program product of claim 7 further comprising instructions for:

receiving a write request for the storage target; and
writing the data to the storage target and the relevant backup copy.

13. A computing system including a processor and memory configured to perform operations comprising:

identifying a storage target that has become corrupt within a data array, wherein the storage target includes one or more corrupt data portions;

identifying a relevant backup copy of the storage target;

establishing a broken mirror between the storage target and the relevant backup copy that identifies one or more differences between the storage target and the relevant backup copy;

rebuilding the storage target by overwriting the corrupt data portions within the storage target with corresponding non-corrupt data obtained from the relevant backup copy;

receiving a read request for the storage target during the rebuilding of the storage target; and determining if the read request concerns the one or more corrupt data portions included within the storage target that have not yet been recovered from the relevant backup copy.

14. The computing system of claim 13 further configured to perform operations comprising:

if the read request concerns the one or more corrupt data portions included within the storage target that have not yet been recovered from the relevant backup copy, obtaining the data requested in the read request from the relevant backup copy.

15. The computing system of claim 13 further configured to perform operations comprising:

if the read request does not concern the corrupt one or more data portions included within the storage target that have not yet been recovered from the relevant backup copy, obtaining the data requested in the read request from the storage target.

16. The computing system of claim 13 wherein identifying a relevant backup copy of the storage target includes:

identifying a backup copy of the storage target, chosen from a plurality of backup copies of the storage target, that predates a corruption date/time of the storage target.

17. The computing system of claim 13 wherein the relevant backup copy is a snapshot of the storage target.

18. The computing system of claim 13 further configured to perform operations comprising:

receiving a write request for the storage target; and
writing the data to the storage target and the relevant backup copy.

\* \* \* \* \*